Sept. 30, 1930.  J. G. MATTHEWS  1,777,124
SHELL REAMER
Filed March 21, 1929
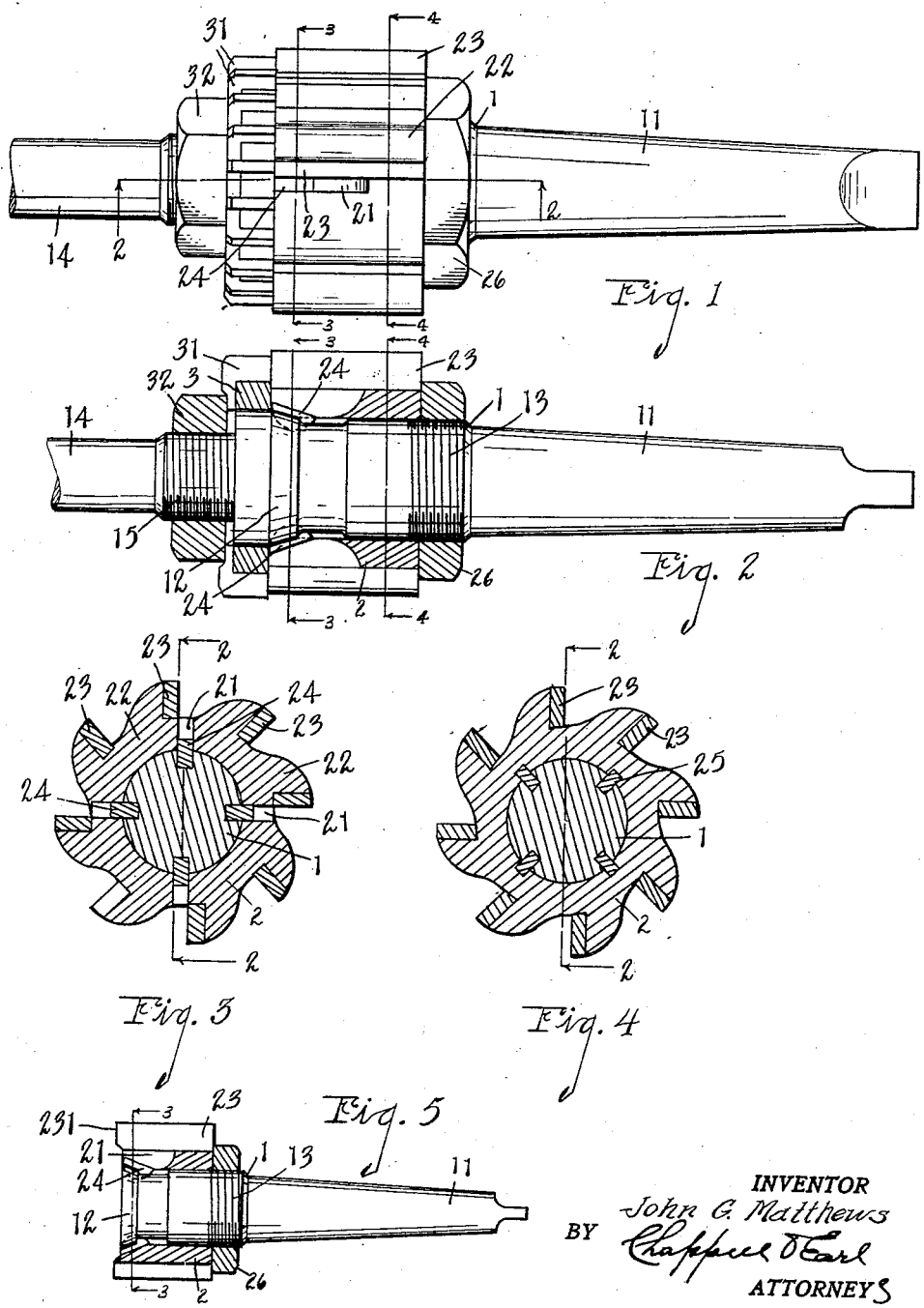
INVENTOR
John G. Matthews
BY
ATTORNEYS Patented Sept. 30, 1930

1,777,124

UNITED STATES PATENT OFFICE

JOHN G. MATTHEWS, OF BEREA, OHIO

SHELL REAMER

Application filed March 21, 1929. Serial No. 348,839.

The main objects of this invention are:

First, to provide an improved adjusting means whereby the sizes of a shell reamer can be restored after wear or grinding.

Second, to provide such an adjusting means that will maintain the size of the shell reamer to the end of the tool for end cutting.

Objects pertaining to details and economies of construction and operation will definitely appear from the description to follow. A preferred embodiment of my invention is clearly illustrated in the accompanying drawing, in which:

Fig. 1 is a side elevation of my improved reamer and end cutter, the end cutter on this reamer being for a special use.

Fig. 2 is a longitudinal sectional view on the irregular longitudinal section indicated by line 2—2 in Figs. 1, 3 and 4.

Fig. 3 is a cross section on line 3—3 of Figs. 1 and 5 showing a pair of the driving keys for the segments.

Fig. 4 is a cross section on line 4—4 of Figs. 1 and 2 showing the plurality of splines for securing the reamer to the boring bar.

Fig. 5 is a modified form of my reamer, the guide and the end cutter being eliminated.

The parts will be identified by their numerals of reference which are the same in all the views.

1 is the boring bar comprising the shank 11, a conical portion 12, a threaded portion 13 and a guide shank 14 threaded at 15 and splined to drive the reamer. 2 is the expanding reamer shell having radial kerfs 21 cut therein, which form the plurality of expansible segments 22 each carrying a pair of the reamer blades 23 secured thereto by brazing or otherwise and adapted to cut at their ends as well. The reamer segments are beveled around the central bore to receive the cone 12 for expanding the same. The reamer shell 2 is forced onto the cone by the screw nut 26 which forces the shell outwardly and expands the cutters on the cone.

A set of keys 24, one for each kerf 21, forms the splines for driving the segments. The keys 25 retain the reamer body on the carrying bar. 3 is the end cutter having a plurality of blades 31 and is secured to the boring bar by the clamping nut 32. In expanding the reamer the nut 32 is loosened and the nut 26 tightened until the reamer is expanded. The nut 32 is then tightened up, which retains the end cutter in place and serves to lock the parts.

In Fig. 5 my improved reamer has been modified by the entire elimination of the end cutter 31 and of the guide 14 and the clamping nut for the end cutter. The ends 231 of the cutter blades 23 have been formed into end cutters and because they project beyond the end of the boring bar permit the boring of holes to the bottom and thus finishing the same. The elasticity of the shell of the reamer is sufficient to maintain the same in place.

A consideration of my improved structure will show that as a boring instrument the end portions of each cutter are subjected to wear and as soon as they are worn in the slightest particular, a fraction of a thousandth of an inch, it is desirable to restore the size of this cutting end. In order to do this it is only necessary to have the shell of the reamer slitted part way in and the very small expansion due to wear can thus be very readily taken care of. When it is done in this way, it is wholly unnecessary to grind the whole length of the cutter but simply to expand the cutting end to take care of the wear. It is possible then by simply honing the cutter to proceed with the boring job.

Again, it is desirable to adjust the tool for a variation in size of a fraction of a thousandth of an inch, for instance in boring seats for ball bearing casings. This is possible to be done to secure a perfectly tight fit in a variation of a thousandth of an inch for smaller size bearings and from two to three thousandths of an inch on the larger sizes. The adjustments suggested are the extremes of what is necessary. This can best be done by simply expanding the end of the reamer cutter, when it is unnecessary to grind the whole length of the cutter blade.

From this it appears that my structure is capable of considerable modification. It is adapted for use with an end cutter which may be clamped thereto or the side cutting blades may be extended even beyond the end of the boring bar and their ends be adapted to end cutting.

I desire to claim the structure in the specific forms in which I have it illustrated and also desire to claim the same broadly as pointed out in the appended claims.

Having thus described my invention, what I claim as new and desire to secure by Letters Patent, is:

1. In a shell reamer, the combination with a splined boring bar suitably threaded and provided with a reverse conical portion adapted to expand the reamer and with a shouldered threaded guide extension, a splined reamer shell with bore beveled for expanding and kerfed at its outer end dividing it into expansible segments, cutter blades on said segments, an adjusting nut back of the said reamer shell for expanding the same, keys on the said shaft engaging the kerfs between the expansible segments and keys to engage said splines, a ring end cutter with projecting blades and a clamp nut for clamping the same to the end of the said reamer structure.

2. In a shell reamer, the combination with a splined boring bar suitably threaded and provided with a reverse conical portion adapted to expand the reamer at the cutting end, a splined reamer shell with bore beveled for expanding and kerfed at its outer end dividing it into expansible segments, cutter blades secured on said segments, an adjusting nut back of the said reamer shell for expanding the same, and keys on the said shaft engaging the kerfs between the expansible segments and keys to engage said splines.

3. In a shell reamer, the combination with a splined boring bar suitably threaded and provided with a reverse conical portion adapted to expand the reamer at the cutting end, a splined reamer shell with bore beveled for expanding and kerfed at its outer end dividing it into expansible segments, cutter blades secured on said segments, an adjusting nut back of the said reamer shell for expanding the same, and keys on the said shaft engaging the kerfs between the expansible segments.

4. In a shell reamer, the combination with a boring bar suitably threaded and provided with a reverse conical portion adapted to expand the reamer at the cutting end, a reamer shell with bore beveled for expanding and kerfed at its outer end dividing it into expansible segments, cutter blades secured on said segments, and an adjusting nut back of the said reamer shell for expanding the same, and means coupling said shell to the boring bar.

5. In a shell reamer, the combination with a boring bar suitably threaded and provided with a reverse conical portion adapted to expand the reamer at the cutting end, a reamer shell with bore beveled for expanding and kerfed at its outer end dividing it into expansible segments, cutter blades with end and side cutting edges secured on said segments provided with end cutting portions, an adjusting nut back of the said reamer shell for expanding the same, and means coupling said shell to the boring bar.

6. In a shell reamer, the combination with a boring bar suitably threaded and provided with a reverse conical portion adapted to expand the reamer and with a shoulder threaded guide extension, a reamer shell with bore beveled for expanding and kerfed at its outer end dividing it into expansible segments, an adjusting nut back of the said reamer shell for expanding the same, and a ring end cutter with projecting blades and clamp nut for clamping the same to the end of the said reamer structure.

7. In a shell reamer, the combination with a splined boring bar suitably threaded and provided with reverse conical portion adapted to expand the reamer at the cutting end, of a reamer shell with bore beveled for expanding and kerfed at its outer end dividing it into end expansible segments, cutter blades secured to said segments, an adjusting nut back of the said reamer shell for adjusting the bar to expand the ends of the said shell, and keys in the splines of the said shaft engaging the kerfs between the expansible segments.

In witness whereof I have hereunto set my hand.

JOHN G. MATTHEWS.